US012018145B2

(12) United States Patent
Kazeto et al.

(10) Patent No.: US 12,018,145 B2
(45) Date of Patent: Jun. 25, 2024

(54) POLYVINYL ALCOHOL RESIN FILM, METHOD FOR DISCRIMINATING POLYVINYL ALCOHOL RESIN FILM, AND METHOD FOR MANUFACTURING POLYVINYL ALCOHOL RESIN FILM

(71) Applicant: KURARAY CO., LTD., Kurashiki (JP)

(72) Inventors: Osamu Kazeto, Kurashiki (JP); Yasutaka Inubushi, Tokyo (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 17/789,669

(22) PCT Filed: Oct. 14, 2021

(86) PCT No.: PCT/JP2021/038144
§ 371 (c)(1),
(2) Date: Jun. 28, 2022

(87) PCT Pub. No.: WO2022/080472
PCT Pub. Date: Apr. 21, 2022

(65) Prior Publication Data
US 2023/0073770 A1    Mar. 9, 2023

(30) Foreign Application Priority Data

Oct. 15, 2020   (JP) ................. 2020-173926

(51) Int. Cl.
| C08L 29/04 | (2006.01) |
| C08F 116/06 | (2006.01) |
| C08F 216/06 | (2006.01) |
| C08J 5/18 | (2006.01) |

(52) U.S. Cl.
CPC ........... *C08L 29/04* (2013.01); *C08F 216/06* (2013.01); *C08J 5/18* (2013.01); *C08F 116/06* (2013.01); *C08J 2329/04* (2013.01); *C08L 2203/16* (2013.01)

(58) Field of Classification Search
None
See application file for complete search history.

(56) References Cited

U.S. PATENT DOCUMENTS

| 2002/0037946 A1* | 3/2002 | Isozaki ............. C08K 5/04 523/128 |
| 2003/0178608 A1* | 9/2003 | Isozaki ............. G02B 5/3033 252/585 |
| 2011/0287204 A1* | 11/2011 | Devisme ........... C08F 210/02 428/36.9 |
| 2011/0313105 A1 | 12/2011 | Kato et al. |
| 2013/0037708 A1 | 2/2013 | Matsumoto et al. |
| 2015/0284560 A1 | 10/2015 | Lee et al. |
| 2022/0195159 A1* | 6/2022 | Yoshida ............. C08F 210/02 |

FOREIGN PATENT DOCUMENTS

| BY | 16604 C1 | 12/2012 | |
| CA | 2 762 583 | 6/2013 | |
| CN | 101798265 A | 8/2010 | |
| CN | 109879996 A | 6/2019 | |
| JP | 3-175404 A | 7/1991 | |
| JP | 2001-253993 A | 9/2001 | |
| JP | 2015-535501 A | 12/2015 | |
| JP | 2017-78166 A | 4/2017 | |
| JP | 2017-219428 A | 12/2017 | |
| JP | 2019-119877 A | 7/2019 | |
| JP | 2020-50789 A | 4/2020 | |
| JP | 6733059 B1 * | 7/2020 | ............. C08F 4/463 |
| KR | 10-2014-0120771 A | 10/2014 | |
| RU | 2 546 651 C2 | 4/2015 | |
| RU | 2 553 293 C1 | 6/2015 | |
| WO | WO 2011/132592 A1 | 10/2011 | |
| WO | WO 2011/136238 A1 | 11/2011 | |
| WO | WO 2012/063954 A1 | 5/2012 | |
| WO | WO 2019/212723 A1 | 11/2019 | |
| WO | WO 2020/004608 A1 | 1/2020 | |
| WO | WO-2020004608 A1 * | 1/2020 | ............. B29C 41/26 |
| WO | WO-2020138437 A1 * | 7/2020 | ........... B29C 41/003 |

OTHER PUBLICATIONS

Babu, R. P. et al., "Current progress on bio-based polymers and their future trends". Progress in Biomaterials 2013, 2(8), 1-16. (Year: 2013).*
Kohn, M. J., "Carbon isotope compositions of terrestrial C3 plants as indicators of (paleo)ecology and (paleo)climate". Proceedings of the National Academy of Sciences 2010, 107(46), 19691-19695. (Year: 2010).*
O'Leary, M. H., "Carbon Isotopes in Photosynthesis". BioScience 1988, 38(5), 328-336. (Year: 1988).*
International Search Report dated Dec. 21, 2021 in PCT/JP2021/038144 filed on Oct. 14, 2021 (3 pages).
Written Opinion of The International Searching Authority dated Dec. 21, 2021 in PCT/JP2021/038144 filed on Oct. 14, 2021 (4 pages).
Netsu Sokutei, "Evaluation of Biobased Content of Biobased plastic by Measuring Carbon-14 Using Accelerator Mass Spectrometry", vol. 39, No. 4., 2012, p. 143-150 (with Partial Translation), 11 pages.

(Continued)

*Primary Examiner* — Richard A Huhn
(74) *Attorney, Agent, or Firm* — Oblon, McClelland, Maier & Neustadt, L.L.P.

(57) ABSTRACT

A PVA film containing PVA that does not increase carbon dioxide existing in the global environment or has a small increase amount even when carbon dioxide is generated by a biodegradation treatment or an incineration treatment. A polyvinyl alcohol resin film having a polyvinyl alcohol resin with an abundance ratio of carbon 14 in total carbon constituting the polyvinyl alcohol resin of $1.0\times10^{-4}$ or more. A method for discriminating a polyvinyl alcohol resin film, the method including discriminating a polyvinyl alcohol resin film containing a polyvinyl alcohol resin (Ab) in which at least part of the carbon is derived from bio-derived ethylene.

13 Claims, No Drawings

(56) References Cited

OTHER PUBLICATIONS

Encyclopedia of Science Technology, polyvinyl alcohol; PVA, Maruzen Co., Ltd., Mar. 5, 1985, p. 1321 (with Partial Translation), 4 pages.

Kirk-Othmer Concise Encyclopedia of Chemical Technology, Poly (vinyl alcohol), Maruzen Co., Ltd., Sep. 20, 1988, p. 1127, (with Partial Translation), 4 pages.

Chemistry Encyclopedia, Petroleum, Kyoritsu Shuppan Co., Ltd., Sep. 15, 1980, p. 312-314, (with Partial Translation), 6 pages.

Convertech, Aug. 2009, Global Environmentally friendly "polyethylene derived from sugarcane", Sugiyama et al., p. 63-67, (with Partial Translation), 9 pages.

Plastics age, 2003, vol. 49, "Technology and Application Development of Biodegradable Plastics", Masuda et al., p. 101-106, (with Partial Translation), 9 pages.

Biomass Nippon Comprehensive Strategy, formulated on Mar. 31, 2006, Ministry of Agriculture, Forestry and Fisheries, (with Partial Translation), 35 pages.

https://www.a-yoshitomi.co.jp/catalog-1.html, Mitsubishi Chemical Holdings, printed on Nov. 15, 2022, (with Partial Translation), 17 pages.

Multipurpose Use of Sugar—Use for intermediate chemical raw materials obtained by fermentation—, Saito, (Reference Previously Filed, Submitting English Translation), 18 pages.

Halima, "Poly(vinyl alcohol): review of its promising applications and insights into biodegradation", RSC Advances, 2016, vol. 6, pp. 39823-39832.

Taiwanese Office Action dated Mar. 6, 2023 in Taiwanese Patent Application No. 110138326, 7 pages.

Mexican Office Action dated Mar. 9, 2023 in Mexican Patent Application No. MX/a/2022/012718, 6 pages.

Extended European Search Report dated Jan. 20, 2023, in corresponding European Patent Application No. 22187540.4, 13 pages.

Saxena, Sushil Kumar: "Polyvinyl Alcohol (PV A) Chemical and Technical Assessment (CTA)", Chemical and technical assessment, Feb. 24, 2004, XP055926263, 3 pages Retrieved from the Internet: URL:https://www.fao.org/fileadmin/templates/agns/pdf/jecfa/cta/61/PVA.pdf [retrieved on May 31, 2022].

Harmsen Paulien F. H. et al: "Green building blocks for bio-based plastics", Biofuels, Bioproducts & Biorefining, vol. 8, No. 3, Jan. 3, 2014, pp. 306-324, XP093013575.

Anonymous: "Polymers—How to determine the source of PVA: crude or plant-based? Chemistry Stack Exchange", 2020, XP055969420, 2 pages, Retrieved from the Internet: URL:https://chemistry.stackexchange.com/questions/134576/how-to-determine-the-source-of-pva-crude-or-plant-based.

Quarta et al., "Determination of the Biobased Content in Plastics by Radiocarbon", Proceedings of the $21^{st}$ International Radiocarbon Conference, Radiocarbon, 2013, vol. 55, pp. 1834-1844, XP055969548.

Santos et al., "Monitoring the biogenic fraction of sugarcane-based plastic bags", Journal of Cleaner Production, 2019, vol. 233, pp. 348-352, XP085735164.

Saito, "Multipurpose Use of Sugar ~ Use for intermediate chemical raw materials obtained by fermentation~", Alic, 2008, 18 pages (with partial English translation), Retrieved from the Internet: URL:https://sugar.alic.go.jp/japan/example_03/example0808a.htm.

Pan et al., "Research and Industrialization of the Process Route for the Production of Polyvinyl Alcohol from Biomass", Anhui Chemical Industry, 2016, vol. 42, No. 6, pp. 67-69 and 75 (4 total pages) (with English Abstract).

Partial European Search Report dated Oct. 19, 2022 in European Patent Application No. 22187540.4, 11 pages.

Third Party Observation submitted on Oct. 28, 2022 in PCT/JP2021/038144, 5 pages.

Combined Chinese Office Action and Search Report dated Nov. 2, 2022 in Chinese Patent Application No. 202180007345.8 (with English translation), 20 pages.

Korean Office Action dated Nov. 7, 2022 in Korean Patent Application No. 10-2022-7015405 (with English translation), 11 pages.

Russian Office Action and Search Report dated Apr. 27, 2023 in Russian Patent Application No. 2022128874/04(063356) (with English language translation), 13 pages.

Supplementary European Search Report dated Jun. 2, 2023, in European Patent Application No. EP 21 88 0207.

Manfred Amann Wacker, et al., "Biodegradability of Poly(vinyl acetate) and Related Polymers Biodegradability of Poly(vinyl acetate) and Related Polymers", Adv. Polym. Sci., Jan. 1, 2022, (vol. 245) pp. 137-172, XP055524385.

Examiner's Report dated Dec. 6, 2023, in Canadian Application No. 3,181,661.

Examination Report dated Feb. 19, 2024, in Australian Application No. 2022271454.

Thibaud F. E. Messerschmid, et al., "Carbon Isotope Composition of Plant Photosynthetic Tissues Reflects a Crassulacean Acid Metabolism (CAM) Continiuum in the Majority of CAM Lineges," Perspectives in Plant Ecology, Evolution and Systematics, 51 (2001), 125619—(14 pages).

* cited by examiner

POLYVINYL ALCOHOL RESIN FILM, METHOD FOR DISCRIMINATING POLYVINYL ALCOHOL RESIN FILM, AND METHOD FOR MANUFACTURING POLYVINYL ALCOHOL RESIN FILM

CROSS REFERENCE TO RELATED APPLICATIONS

This application is a National Stage entry under 35 U.S.C. § 371 of PCT/JP2021/038144, filed on Oct. 14, 2021, and claims priority to Japanese Application No. 2020-173926, filed on Oct. 15, 2020, the entire contents of which are incorporated herein by reference.

TECHNICAL FIELD

The present invention relates to a polyvinyl Alcohol resin film, a method for discriminating polyvinyl Alcohol resin film, and a method for manufacturing polyvinyl Alcohol resin film.

BACKGROUND ART

A film containing a polyvinyl alcohol resin (Hereinafter, it may be referred to as PVA.) has unique properties such as water solubility and optical characteristics, and is therefore used in various applications that take advantage of its characteristics, such as a water-soluble film for drug packaging and a seed tape, and an optical film as used a raw material for a polarizing film for a liquid crystal display.

The PVA is also known as a synthetic resin which has an unusual biodegradability as a synthetic resin and has a small environmental load. However, most of raw materials for producing the PVA are produced using fossil fuel-derived compounds such as petroleum, coal, and natural gas as a starting material. Fossil fuel contains carbon that has been fixed in the ground for many years. Therefore, the PVA is subjected to biodegradation treatment by microorganisms or incineration treatment like a usual synthetic resin to release carbon dioxide into the atmosphere, which causes carbon that was fixed deep in the ground and did not exist in the atmosphere is released into the atmosphere as carbon dioxide, and may cause global warming.

On the other hand, if a material obtained from a living organism (a plant, an animal) that absorbs carbon dioxide circulating in the global environment and is grown by a nutrient source in which the carbon dioxide is converted into an organic substance is used as a raw material of a synthetic resin, even if the material is subjected to biodegradation treatment or incineration treatment to generate carbon dioxide, the carbon dioxide existing in the global environment circulates, and thus the total amount of carbon constituting the carbon dioxide does not change.

In particular, plants are living organisms that absorbs carbon dioxide circulating in the global environment, performs a photosynthesis reaction using carbon dioxide and water as raw materials, and assimilates and immobilizes carbon dioxide as an organic body, and thus are attracting attention as a carbon source. For example, an alcohol component, particularly ethyl alcohol, is distilled and separated from a fermentation product of sugar extracted from a plant raw material such as sugar cane or corn or a cellulose fermentation product, and ethylene as an alkene can be obtained by a dehydration reaction thereof. When a vinyl ester monomer (Hereinafter, it may be referred to as a bio-vinyl ester monomer.) is synthesized using the bio-derived ethylene (Hereinafter, it may be referred to as bio-ethylene.) as a raw material, and a polyvinyl ester obtained by polymerizing this bio-vinyl ester monomer is saponified to produce a PVA (Hereinafter, it may be referred to as a bio-PVA.), carbon dioxide existing in the global environment is not increased even if this bio-PVA is subjected to a biodegradation treatment or an incineration treatment to generate carbon dioxide, and this does not cause global warming.

Carbon constituting carbon dioxide circulating in the global environment is a mixture of radioactive carbon 14 (Hereinafter, it may be referred to as $^{14}C$.) that is an isotope, stable carbon 12 (Hereinafter, it may be referred to as $^{12}C$.), and metastable carbon 13 (Hereinafter, it may be referred to as $^{13}C$.), and it is known that the mass ratio thereof is 98.892 mass % for $^{12}C$, 1.108 mass % for $^{13}C$, and $1.2\times10^{-12}$ mass % to $1.2\times10^{-10}$ mass % (trace amount) for $^{14}C$. The ratio between $^{12}C$ and $^{13}C$ is stable. Since radioactive $^{14}C$ is generated when a neutron contained in a secondary cosmic ray generated by a primary cosmic ray in the upper layer of the atmosphere collides with a nitrogen atom ($^{14}N$) in the atmosphere, the radioactive $^{14}C$ is continuously supplied although it slightly fluctuates due to the intensity of the sunspot activity of the sun, but on the other hand, the radioactive $^{14}C$ decreases with a half-life of 5730 years.

Since carbon constituting the body of a living organism that grows by constantly absorbing carbon dioxide circulating in the global environment continues to be updated during its survival, carbon continues to take over the mass ratio of the three types of carbon isotopes constituting carbon dioxide circulating in the global environment. When a living organism is killed, the mass ratio of the three types of carbon isotopes inside the living organism is fixed at the ratio at the time of death. The half-life of $^{14}C$ is 5730 years, and the mass ratio of $^{14}C$ in the fossil fuel formed over a long period of time after the death of a living organism that lived in ancient times long before this is very small compared to the mass ratio of $^{14}C$ in carbon dioxide circulating in the global environment since the fossil fuel is isolated from modern carbon dioxide circulating in the global environment.

Therefore, since a value of the abundance ratio of $^{14}C$ in carbon constituting a normal PVA using a fossil fuel as a raw material is also significantly smaller than the abundance ratio of $^{14}C$ in carbon constituting a bio-PVA, that is, substantially 0%, the bio-PVA and the fossil fuel-derived PVA can be distinguished from each other by measuring the abundance ratio of $^{14}C$ in contained carbon.

As applications of a polyvinyl alcohol resin film (Hereinafter, the film may be referred to as a PVA film.) containing a polyvinyl alcohol resin, a raw fabric film in the production of an optical film such as a polarizing film, which is a component of an LCD such as a liquid crystal television, or a film for drug packaging in individual packaging of a drug or the like in a single use amount is exemplified, and the demand has been continuously expanding in recent years. The PVA film used for these applications is required to have very high quality such as very few defects and almost no unevenness in thickness.

SUMMARY OF INVENTION

Technical Problem

As described above, a PVA film is used in various applications such as a raw fabric film for producing an optical film and a film for drug packaging, but in the market, problems caused by the quality of the PVA film may occur in end products such as a liquid crystal television and a drug package including an optical film using the PVA film. In that case, it is necessary to identify whether the PVA film that is the cause of the problem is produced by own company or produced by another company. However, in the conventionally known technique, it is very difficult to identify the manufacturer of the PVA film by analyzing the PVA film used for the end product in which the problem has occurred. Therefore, there has been a demand for a method for easily and reliably discriminating the manufacturer of the used PVA film for the end product in which the problem has occurred in the market.

Therefore, first, an object of the present invention is to provide a PVA film using PVA that does not increase carbon dioxide existing in the global environment or has a small increase amount even when carbon dioxide is generated by a biodegradation treatment or an incineration treatment. Secondly, an object of the present invention is to provide a method for easily and reliably discriminating a manufacturer of a PVA film.

ASTM D6866 by the National Institute of Standards and Technology (NIST) is known for distinguishing between a plant-derived organic substance and a fossil fuel-derived organic substance. ASTM D6866 is an ASTM (American Society for Testing and Materials) standard for determining biogenic carbon concentrations in solid, liquid and gas samples utilizing a radiocarbon dating method, and the currently effective version of the standard is ASTM D6866-20 which was implemented in February 2020. According to this method, it is possible to discriminate between a film containing bio-PVA and a film that does not contain bio-PVA and contains only fossil fuel-derived PVA.

Solution to Problem

That is, the present invention relates to:
[1] A polyvinyl alcohol resin film comprising a polyvinyl alcohol resin (A), wherein an abundance ratio of carbon 14 ($^{14}$C) in total carbon constituting the polyvinyl alcohol resin (A), that is, $^{14}$C/C is $1.0 \times 10^{-14}$ or more.
[2] The polyvinyl alcohol resin film according to [1], wherein a carbon stable isotope ratio $\delta^{13}$C of carbon 13 ($^{13}$C) is –20% or more.
[3] The polyvinyl alcohol resin film according to claim 1, wherein a carbon stable isotope ratio $\delta^{13}$C of carbon 13 ($^{13}$C) is less than –20%.
[4] The polyvinyl alcohol resin film according to any one of [1] to [3], wherein all or a part of the polyvinyl alcohol resin (A) is a polyvinyl alcohol resin (Ab) in which all or a part of carbon is derived from bio-derived ethylene (Bb).
[5] The polyvinyl alcohol resin film according to any one of [1] to [4], wherein the polyvinyl alcohol resin (A) contains an ethylene unit, and a content of the ethylene unit with respect to total monomer units of the polyvinyl alcohol resin (A) is 1 mol % or more and less than 15 mol %.
[6] The polyvinyl alcohol resin film according to any one of [1] to [5], wherein the polyvinyl alcohol resin (A) has a degree of saponification of 80 mol % or more.
[7] The polyvinyl alcohol resin film according to any one of [1] to [6], wherein the polyvinyl alcohol resin (A) has a degree of polymerization of 200 or more and less than 8,000.
[8] The polyvinyl alcohol resin film according to any one of [1] to [7], wherein the polyvinyl alcohol resin (A) has a content of a 1,2-glycol bond of 0.2 mol % or more and less than 2.0 mol %.
[9] The polyvinyl alcohol resin film according to any one of [1] to [8], wherein the polyvinyl alcohol resin (A) has an alkoxyl group at a polymer terminal, and a content of the alkoxyl group with respect to total monomer units of the polyvinyl alcohol resin (A) is 0.0005 mol % or more and less than 1 mol %.
[10] An optical film using the polyvinyl alcohol resin film according to any one of [1] to [9].
[11] A water-soluble film using the polyvinyl alcohol resin film according to any one of [1] to [9].
[12] A package in which a detergent, an agricultural chemical, or a disinfectant is packaged with the water-soluble film according to [11].
[13] A method for discriminating a polyvinyl alcohol resin film, the method comprising discriminating a polyvinyl alcohol resin film containing a polyvinyl alcohol resin (Ab) in which all or a part of carbon is derived from bio-derived ethylene (Bb) from a polyvinyl alcohol resin film containing only a polyvinyl alcohol resin (Ap) derived only from fossil fuel-derived ethylene (Bp) by measuring an abundance ratio $^{14}$C/C of carbon 14 ($^{14}$C) in total carbon.
[14] A method for discriminating a polyvinyl alcohol resin film, the method comprising discriminating a polyvinyl alcohol resin film containing a polyvinyl alcohol resin (Ab) in which all or a part of carbon is derived from bio-derived ethylene (Bb) from a polyvinyl alcohol resin film, different from the polyvinyl alcohol resin film, containing a polyvinyl alcohol resin (Ab) in which all or a part of carbon is derived from bio-derived ethylene (Bb) by measuring an abundance ratio $^{14}$C/C of carbon 14 ($^{14}$C) in total carbon.
[15] The method for discriminating a polyvinyl alcohol resin film according to [13] or [14], wherein whether bio-derived ethylene (Bb) is C3 plant-derived ethylene (Bb) or C4 plant-derived ethylene (Bb) is discriminated by measuring a carbon stable isotope ratio $\delta^{13}$C of carbon 13 ($^{13}$C) for a polyvinyl alcohol resin film containing a polyvinyl alcohol resin (Ab) in which all or a part of carbon is derived from bio-derived ethylene (Bb).
[16] The method for discriminating a polyvinyl alcohol resin film according to [15], wherein when the carbon stable isotope ratio $\delta^{13}$C of ($^{13}$C) of carbon 13 is –20% or more, bio-derived ethylene (Bb) is discriminated as C4 plant-derived ethylene (Bb), and when the carbon stable isotope ratio $\delta^{13}$C is less than –20% bio-derived ethylene (Bb) is discriminated as C3 plant-derived ethylene (Bb).
[17] A method for discriminating a polyvinyl alcohol resin film, the method comprising discriminating a polyvinyl alcohol resin film containing a polyvinyl alcohol resin (Ab) in which all or a part of carbon is derived from bio-derived ethylene (Bb) from a polyvinyl alcohol resin film containing only a polyvinyl alcohol resin (Ap) derived only from fossil fuel-derived ethylene (Bp) by measuring a carbon stable isotope ratio $\delta^{13}$C of ($^{13}$C) of carbon 13.
[18] A method for discriminating a polyvinyl alcohol resin film, the method comprising discriminating a polyvinyl alcohol resin film containing a polyvinyl alcohol resin (Ab) in which all or a part of carbon is derived from bio-derived ethylene (Bb) from a polyvinyl alcohol resin film, different from the polyvinyl alcohol resin film, containing a polyvinyl alcohol resin (Ab) in which all or a part of carbon is derived from bio-derived ethylene (Bb) by measuring a carbon stable isotope ratio $\delta^{13}C$ of ($^{13}C$) of carbon 13.

[19] A method for producing a polyvinyl alcohol resin film, the method comprising:

synthesizing a vinyl ester monomer by reacting a compound having a carboxy group with bio-derived ethylene (Bb), or synthesizing a vinyl ester monomer by reacting a compound having a carboxy group with ethylene (Bb);

polymerizing the obtained vinyl ester monomer to obtain a polyvinyl ester;

saponifying the obtained polyvinyl ester to obtain a polyvinyl alcohol resin (Ab); and using the obtained polyvinyl alcohol resin (Ab) to produce a polyvinyl alcohol resin film.

Advantageous Effects of Invention

According to the present invention, first, it is possible to provide a PVA film using PVA that does not increase carbon dioxide existing in the global environment or has a small increase amount even when carbon dioxide is generated by a biodegradation treatment or an incineration treatment. According to the present invention, secondly, it is possible to provide a method for easily and reliably discriminating a manufacturer of a PVA film.

DESCRIPTION OF EMBODIMENTS

Hereinafter, the invention will be specifically described.

Abundance Ratio of $^{14}C$

The PVA film of the present invention contains PVA (A) which is a saponified product of a polyvinyl ester, and the abundance ratio of $^{14}C$ in the total carbon atoms constituting the PVA (A), that is, $^{14}C/C$ (Hereinafter, it may be referred to as $^{14}C/C$.), is $1.0\times10^{-14}$ or more. Total carbon is the sum of all carbon isotopes, and $^{14}C/C$ is the ratio of $^{14}C$ to total carbon. When $^{14}C/C$ is less than $1.0\times10^{-14}$, it is close to the measurement lower limit of the measurement method in accordance with ASTM D6866, it is difficult to perform accurate measurement, and it is difficult to discriminate whether PVA (A) contained in the PVA film is bio-PVA. In addition, the small $^{14}C/C$ indicates that the ratio of bio-derived raw material used in the production of the PVA (A) is small, and the effect of reducing the increase amount of carbon dioxide existing in the global environment becomes insufficient. $^{14}C/C$ is preferably $2.0\times10^{-14}$ or more, more preferably $5.0\times10^{-14}$ or more, and still more preferably $1.0\times10^{-13}$ or more. On the other hand, the upper limit of $^{14}C/C$ is not particularly limited, but since a bio-derived raw material is generally more expensive than a fossil fuel-derived raw material, $^{14}C/C$ is preferably $1.0\times10^{-11}$ or less, more preferably $7.0\times10^{-12}$ or less, and still more preferably $5.0\times10^{-12}$ or less.

In the present invention, the method for measuring $^{14}C/C$ is not particularly limited, and for example, a sample (for example, vinyl acetate) is converted into carbon dioxide or graphite as necessary, and then subjected to accelerator mass spectrometry (AMS method) to compare and measure the content of $^{14}C$ with respect to a standard substance (for example, oxalic acid in U.S. NIST). $^{14}C/C$ can be calculated by dividing the amount of $^{14}C$ in the sample by the total amount of carbon in the sample.

Carbon Stable Isotope Ratio $\delta^{13}C$

The carbon stable isotope ratio $\delta^{13}C$ of $^{13}C$ (Hereinafter, it may be referred to as $\delta^{13}C$.) in the present invention refers to the ratio of $^{13}C$ to $^{12}C$ among the three types of isotopes of carbon atoms existing in nature (abundance ratio $^{12}C$:$^{13}C$:$^{14}C$=98.9:1.11:1.2×10$^{-12}$, units; %), and the carbon stable isotope ratio is expressed as a deviation with respect to a standard substance, and means the value ($\delta$ value) defined by the following formula.

$$\delta^{13}C[\%]=\{(^{13}C/^{12}C)_{sample}/(^{13}C/^{12}C)_{PDB}-1.0\}\times 1{,}000$$

Here, $[(^{13}C/^{12}C)_{sample}]$ represents a stable isotope ratio of a sample to be measured, and $[(^{13}C/^{12}C)_{PDB}]$ represents a stable isotope ratio of a standard substance. PDB is an abbreviation of "Pee Dee Belemnite" and means a fossil of arrowheads made of calcium carbonate (as a standard substance, a fossil of arrowheads unearthed from a PeeDee layer in South Carolina State), and is used as a standard body having a $^{13}C/^{12}C$ ratio. The "carbon stable isotope ratio $\delta^{13}C$" is measured by an accelerator mass spectrometry method. Since the standard substance is rare, a working standard in which a stable isotope ratio with respect to the standard substance is known can also be used.

C3 Plant and C4 Plant

Bio-ethylene is roughly divided into two groups depending on the plant as a raw material thereof, and there are bio-ethylene derived from C3 plants such as sweet potato, sugar beet, rice, a tree, and an alga, and bio-ethylene derived from C4 plants such as corn, sugar cane, and cassava, and the $\delta^{13}C$ of both groups are greatly different. In the case of a PVA using C3 plant-derived bio-ethylene as a raw material, $\delta^{13}C$ is less than −20‰, and in the case of a PVA using C4 plant-derived bio-ethylene as a raw material, $\delta^{13}C$ is −20‰ or more. Therefore, the PVA using C3 plant-derived bio-ethylene as a raw material and the PVA using C4 plant-derived bio-ethylene as a raw material can be discriminated by measuring $\delta^{13}C$ after the above $^{14}C/C$ is measured to exclude the possibility of being a fossil fuel-derived PVA.

Plants are classified into three types of a C3 plant, a C4 plant, and a suckling plant type photosynthesis (CAM/Crassulacean Acid Metabolism) plant from the types of initial fixed products of carbon dioxide in the photosynthesis carbonic acid fixation route. In the crop, corn and miscellaneous grain crops are the C4 plant, main crops such as rice and wheat are the C3 plant, and Cactaceae, Crassulaceae, Euphorbiaceae, and the like are the CAM plant.

More than 90% of the plants on the earth belong to the C3 plant, and include, for example, agriculturally useful plants such as rice, wheat, tobacco, wheat, potato, and oil palm. The enzyme involved in the fixation of carbon dioxide in the photosynthesis pathway of the C3 plant is ribulose-1,5-diphosphate carboxylase, which has low affinity for carbon dioxide and conversely high affinity for oxygen, so that the efficiency of the carbon dioxide fixation reaction and thus the photosynthesis reaction is low.

The PVA film of the present invention preferably has a carbon stable isotope ratio $\delta^{13}C$ of carbon 13 ($^{13}C$) of less than −20‰ as measured by an accelerator mass spectrometry. $\delta^{13}C$ is more preferably −50‰ or more, still more preferably −45‰ or more, and particularly preferably −40‰ or more. $\delta^{13}C$ is more preferably −22‰ or less, still more preferably −25% or less, and particularly preferably −26% or less. The fact that the carbon stable isotope ratio $\delta^{13}C$ in the PVA film of the present invention is in the above range indicates that a PVA using C3 plant-derived bio-ethylene as a raw material is used as a PVA (A) contained in the PVA film, and it is preferable from the viewpoint of cost of a raw material and suppliability. As the C3 plant, rice, wheat, potato, and palm oil are preferable.

The C4 plant is a plant that performs C4 type photosynthesis, and is a form of photosynthesis having a C4 pathway for concentration of carbon dioxide in addition to a Calvin-Benson's cycle which is a general carbon dioxide reduction cycle in the process of photosynthesis. The enzyme involved in carbon dioxide fixation in the photosynthesis pathway of the C4 plant is phosphoenolpyruvate carboxylase. This enzyme is characterized in that it is not inhibited in activity by oxygen, has a high ability to fix carbon dioxide, and has a developed chloroplast also in a vascular sheath cell. Representative C4 plants include corn, sugar cane, cassava, sorghum, miscanthus sinensis, guineagrass, rhodes grass, urochloa subquadripara, Setaria Italica, barnyard millet, Eleusine Coracana, broom cypress, and the broom cypress is also referred to as burning bush, a broom tree, or Kochia scoparia. Such C4 plants use extra energy to fix carbon dioxide, and thus can fix carbon dioxide more efficiently than other plants other than C4 plants. In addition, it is difficult for other plants other than the C4 plant to collect carbon dioxide at a high temperature, but the C4 plant does not. In addition, photosynthesis can be sufficiently performed even when the amount of water is small. This is a physiological adaptation to cope with harsh climates for plants such as high temperature, dry, low carbon dioxide, and poor nitrogen soil.

In the PVA film of the present invention, the carbon stable isotope ratio $\delta^{13}C$ of carbon 13 ($^{13}C$) measured by an accelerator mass spectrometry method is preferably −20% or more. $\delta^{13}C$ is more preferably −18% or more, still more preferably −15% or more, and particularly preferably −13% or more. $\delta^{13}C$ is more preferably −1% or less, still more preferably −4% or less, and particularly preferably −7% or less. The fact that the carbon stable isotope ratio $\delta^{13}C$ in the PVA film of the present invention is in the above range indicates that PVA using C4 plant-derived bio-ethylene as a raw material was used as PVA (A) contained in the PVA film. Here, C4 plant-derived bio-ethylene tends to be less easily available than C3 plant-derived bio-ethylene, and thus the manufacturer of the PVA film can be more easily and reliably discriminated when the carbon stable isotope ratio $\delta^{13}C$ in the PVA film of the present invention is in the above range. In addition, as the C4 plant, corn, sugar cane, and cassava are preferable from the viewpoint of production amount and cost.

In addition, as plants other than the C3 plant and the C4 plant, the CAM plant has a photosynthesis system adapted to a dry environment, and this photosynthesis system is considered to be an evolved form of a kind of C3 photosynthesis. The $\delta^{13}C$ of the CAM plant is generally in a range of about −35% to about −10%, and these CAM plants can be used in combination as a biomass raw material as long as the effect of the present invention is not hindered as necessary.

As the PVA film of the present invention, a mixture of a PVA having different $^{14}C/C$ or $\delta^{13}C$ may be used as a raw material as long as $^{14}C/C$ and, if necessary, $\delta^{13}C$ are within the above range.

For example, not only a PVA film showing $\delta^{13}C$ is obtained using a C3 plant-derived raw material, but also a predetermined $\delta^{13}C$ is obtained by mixing PVAs having different $\delta^{13}C$, that is, $\delta^{13}C$ that cannot be achieved by a simple substance of a C3 plant is included, and more specific $\delta^{13}C$ is obtained, whereby the discrimination accuracy of the obtained PVA film can be further enhanced. That is, when a raw material having a different $\delta^{13}C$ is used, a statistical analysis value obtained by analyzing the carbon stable isotope ratio is unique, and thus the raw material can be distinguished from other raw materials. Therefore, the $\delta^{13}C$ of a PVA film produced from such a raw material also has a unique analysis value, and identification and tracking become easy.

Polyvinyl Alcohol Resin

In the PVA film of the present invention, all or a part of the PVA (A) is preferably a polyvinyl alcohol resin (Ab) in which all or a part of carbon constituting the PVA (A) is derived from bio-derived ethylene (Bb). That is, in the PVA film of the present invention, the PVA (A) may be PVA (Ab) alone, or may be a mixture of a PVA (Ab) and PVA (Ap) obtained only from a fossil fuel-derived raw material.

A method for obtaining PVA (Ab) is not particularly limited, and for example, (1) a method in which only the polyvinyl ester (db1) obtained by polymerizing only the bio-vinyl ester monomer (Cb1) is saponified to obtain a PVA (Ab1), (2) a method of saponifying a polyvinyl ester (db2) obtained by polymerizing a bio-vinyl ester monomer (Cb2) using a mixture of bio-ethylene (Bb) and fossil fuel-derived ethylene (Bp) as raw materials to obtain a PVA (Ab2), (3) a method of saponifying a polyvinyl ester (db3) obtained by copolymerizing the bio-vinyl ester monomer (Cb1) and a vinyl ester monomer (Cp) using fossil fuel-derived ethylene (Bp) as a raw material to obtain a PVA (Ab3), (4) a method in which a mixture of the polyvinyl ester (db1) and a polyvinyl ester (Dp) obtained by polymerizing only a fossil fuel-derived vinyl ester monomer (Cp) is saponified to obtain a PVA (Ab4), and (5) a method in which the methods (2) to (4) are combined.

Examples of the vinyl ester monomer include vinyl formate, vinyl acetate, vinyl propionate, vinyl valerate, vinyl laurate, vinyl stearate, vinyl benzoate, vinyl pivalate, and vinyl versatate, and among these, vinyl acetate is preferable.

The method for producing the vinyl ester monomer is not particularly limited, and for example, the vinyl ester monomer can be obtained by reacting ethylene with a compound having a carboxy group represented by R—COOH. Vinyl acetate can be synthesized as follows. Normally, vinyl acetate can be obtained by gas-phase reaction of ethylene, acetic acid, and oxygen in the presence of a catalyst. At this time, by using ethylene containing a predetermined amount of $^{14}C$ or acetic acid containing a predetermined amount of $^{14}C$ as the compound having a carboxy group, vinyl acetate containing a predetermined amount of $^{14}C$ is obtained. Examples of ethylene containing the predetermined amount of $^{14}C$ include bio-ethylene.

In the production of the vinyl ester monomer, it is preferable to use a bio-derived raw material as raw materials other than ethylene such as carboxylic acid, but the carboxylic acid group is removed from the polymer main chain of the polyvinyl ester at the time of saponification, and is usually recovered and reused. Therefore, even when using a fossil fuel-derived raw material, carbon dioxide existing in the global environment does not increase, and does not cause global warming.

The polyvinyl ester is preferably obtained using one kind or two or more kinds of vinyl ester monomers, and more preferably obtained using only one kind of vinyl ester monomer. In addition, the polyvinyl ester may be a copolymer of one kind or two or more kinds of vinyl ester monomers and other monomers copolymerizable with the same.

The other monomers copolymerizable with the vinyl ester monomer are preferably ethylene. That is, the PVA contained in the PVA film of the present invention preferably contains an ethylene unit. In addition, the content of the ethylene unit is preferably 1 mol % or more, and more preferably 1.5 mol % or more, based on the number of moles of all structural units constituting the vinyl ester polymer. In addition, the content of the ethylene unit is preferably less than 15 mol %, and more preferably less than 10 mol %, based on the number of moles of all structural units constituting the vinyl ester polymer. When the content of the ethylene unit is within the above range, water resistance and the like can be improved without significantly impairing optical characteristics of the PVA film when the PVA film of the present invention is used as a raw fabric film for producing an optical film. The reason for this is not necessarily clear, but it is presumed that while the hydrophilicity is weakened by introducing an ethylene unit into the polymer main chain, the volume occupied by the ethylene unit in the crystal is not greatly different from that of the vinyl alcohol unit, so that the crystal structure of a PVA is not greatly disturbed.

Examples of other monomers copolymerizable with the vinyl ester monomer include olefins having 3 to 30 carbon atoms, such as propylene, 1-butene, and isobutene, in addition to ethylene; acrylic acid or a salt thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid or a salt thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide derivatives such as acrylamide, N-methylacrylamide, N-ethylacrylamide, N,N-dimethylacrylamide, diacetone acrylamide, acrylamide propane sulfonic acid or a salt thereof, acrylamide propyl dimethylamine or a salt thereof, and N-methylol acrylamide or a derivative thereof; methacrylamide derivatives such as methacrylamide, N-methylmethacrylamide, N-ethylmethacrylamide, methacrylamidopropanesulfonic acid or a salt thereof, methacrylamidopropyldimethylamine or a salt thereof, and N-methylolmethacrylamide or a derivative thereof; N-vinylamide such as N-vinylformamide, N-vinylacetamide, and N-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; vinyl cyanide such as acrylonitrile and methacrylonitrile; vinyl halides such as vinyl chloride, vinylidene chloride, vinyl fluoride, and vinylidene fluoride; allyl compounds such as allyl acetate and allyl chloride; maleic acid or a salt, ester or acid anhydride thereof; itaconic acid or a salt thereof, ester or acid anhydride; vinylsilyl compound such as vinyltrimethoxysilane; and isopropenyl acetate. The vinyl ester-based polymer can have a structural unit derived from one kind or two or more kinds among these other monomers.

The ratio of the structural unit derived from another monomer to the polyvinyl ester is preferably 15 mol % or less, and more preferably 5 mol % or less based on the number of moles of all structural units constituting the polyvinyl ester from the viewpoint of the strength of the obtained PVA film, optical performance in the case of using the PVA film as a raw fabric film for producing an optical film.

As another monomer copolymerizable with the vinyl ester monomer, a fossil fuel-derived monomer may be used, or a plant-derived monomer may be used.

In the PVA film of the present invention, the degree of polymerization of a PVA (A) is preferably 200 or more. The degree of polymerization of the PVA (A) is preferably less than 8,000. From the viewpoint of the strength of the PVA film, the degree of polymerization of the PVA (A) is more preferably 300 or more, and still more preferably 500 or more. On the other hand, from the viewpoint of productivity of the PVA (A) or the PVA film, the degree of polymerization of the PVA (A) is more preferably less than 5,000, and still more preferably less than 3,000. Here, the degree of polymerization of a PVA (A) means an average degree of polymerization Po measured according to the description of JIS K6726-1994, and is determined from a limiting viscosity [η] (unit: deciliter/g) measured in water at 30° C. after re-saponification and purification of a PVA by the following formula.

$$Po = ([\eta] \times 10^4 / 8.29)^{(1/0.62)}$$

In the PVA film of the present invention, the degree of saponification of the PVA (A) is preferably 80 mol % or more. When the degree of saponification is less than 80 mol %, water solubility is easily impaired when the PVA film is used as a film for drug packaging, and optical characteristics are easily impaired when the PVA film is used as a raw fabric film for producing an optical film. The degree of saponification is more preferably 84 mol % or more, and still more preferably 88 mol % or more. On the other hand, the degree of saponification is preferably less than 100 mol %, more preferably less than 99.999 mol %, and still more preferably less than 99.995 mol %. Here, the degree of saponification of a PVA refers to a ratio (mol %) of the number of moles of the vinyl alcohol unit to the total number of moles of a structural unit (typically, a vinyl ester monomer unit) that can be converted into a vinyl alcohol unit by saponification and the vinyl alcohol unit that the PVA has. The degree of saponification of a PVA can be measured according to the description of JIS K6726-1994.

In the PVA film of the present invention, the content of the 1,2-glycol bond in the PVA (A) is preferably 0.2 mol % or more. The content of the 1,2-glycol bond in the PVA (A) is preferably less than 2.0 mol %. When the content of the 1,2-glycol bond is less than 2.0 mol %, good optical characteristics and mechanical strength are easily obtained when the PVA film is used as a raw fabric film for producing an optical film. On the other hand, when the content of the 1,2-glycol bond is 0.2 mol % or more, productivity in the production of the PVA (A) can be increased, and the production cost can be reduced. The content of the 1,2-glycol bond in the PVA (A) is more preferably 0.4 mol % or more, and still more preferably 0.6 mol % or more. The content of the 1,2-glycol bond in the PVA (A) is more preferably less than 1.9 mol %, and still more preferably less than 1.8 mol %.

In the PVA film of the present invention, it is preferable that the PVA (A) has an alkoxyl group at the polymer terminal, and the content of the alkoxyl group with respect to total monomer units (Hereinafter, it may be referred to as the content of the terminal alkoxyl group) is 0.0005 mol % or more. The content of the terminal alkoxyl group is preferably less than 1 mol %. The method for introducing an alkoxyl group into the polymer terminal is not particularly limited, and examples thereof include a method in which a vinyl ester is polymerized using a polymerization initiator having an alkoxyl group.

When the PVA film of the present invention is used as a raw fabric film for producing an optical film, for example, when a polarizing film is produced using a PVA film as a raw fabric film, if the PVA (A) is eluted into a treatment liquid in a production process and the concentration of the PVA (A) in the treatment liquid is increased, fine particles of the PVA (A) are precipitated in the treatment liquid due to progress of boric acid crosslinking and adhere to the PVA film, and foreign matters derived from the PVA fine particles remain on the surface of the resulting polarizing film, which may cause a problem. In the PVA film of the present invention, since the PVA (A) has an alkoxyl group at the polymer terminal and the content thereof with respect to total monomer units is 0.0005 mol % or more and less than 1 mol %, the occurrence of this problem can be suppressed. When the content of the terminal alkoxyl group is less than 0.0005 mol %, foreign matter defects on the surface of the polarizing film derived from the fine particles of a PVA (A) may not be sufficiently reduced. When the content of the terminal alkoxyl group is more than 1 mol %, the polarizing performance of the resulting polarizing film may be insufficient when the PVA film of the present invention is used as a raw fabric film for producing an optical film. The content of the terminal alkoxyl group with respect to total monomer units is more preferably 0.001 mol % or more, and still more preferably 0.005 mol % or more. The content of the terminal alkoxyl group with respect to total monomer units is more preferably less than 0.1 mol %, and still more preferably less than 0.05 mol %.

In the PVA film in the present invention, one kind of a PVA may be used as the PVA (A), or two or more kinds of a PVA having different degrees of polymerization, saponification, and modification be blended and used. When two or more kinds of a PVA are blended and used, PVA derived from biomass such as bio-ethylene other than PVA (A) and PVA (A) may be blended, PVA (A) and PVA derived from petroleum or fossil may be blended, or both may be combined.

In the present invention, the content of the PVA (A) in the PVA film is not particularly limited, but is preferably 50 mass % or more, more preferably 80 mass % or more, and still more preferably 85 mass % or more. In addition, the content may be 100 mass %, but is preferably 99 mass % or less, and may be 95 mass % or less, and further 90 mass % or less in consideration of compatibility between the availability of biomass and the performance as a polarizing film.

Plasticizer

The PVA film of the present invention is more rigid than other plastic films in a state of not containing a plasticizer, and mechanical physical properties such as impact strength and process passability at the time of secondary processing may be a problem. In order to prevent these problems, the PVA film of the present invention preferably contains a plasticizer. Preferable examples of the plasticizer include a polyhydric alcohol, and specific examples thereof include polyhydric alcohols such as ethylene glycol, glycerin, diglycerin, propylene glycol, diethylene glycol, triethylene glycol, tetraethylene glycol, trimethylolpropane, and sorbitol. These plasticizers may be used singly or in combination of two or more kinds thereof. Among these plasticizers, ethylene glycol or glycerin is preferable, and glycerin is more preferable from the viewpoint of difficulty in bleeding out to the film surface. In addition, it is preferable to use a plasticizer produced from a bio-derived raw material.

The content of the plasticizer in the PVA film of the present invention is preferably 1 part by mass or more, more preferably 3 parts by mass or more, and still more preferably 5 parts by mass or more with respect to 100 parts by mass of the PVA contained in the PVA film. In addition, the content of the plasticizer is preferably 70 parts by mass or less, more preferably 50 parts by mass or less, and still more preferably 40 parts by mass or less. When the content of the plasticizer is less than 1 part by mass, the effect of improving mechanical physical properties such as impact strength of the PVA film may not be sufficient. On the other hand, when the content of the plasticizer is more than 70 parts by mass, the PVA film becomes too soft, so that the handleability may be deteriorated or bleeding out may occur on the film surface.

Starch/Water-Soluble Polymer

The PVA film of the present invention may contain starch and/or a water-soluble polymer other than the PVA (A). Containing such a water-soluble polymer makes it possible to impart mechanical strength to the PVA film, maintain moisture resistance when handling the PVA film, or adjust the rate of softening due to absorption of water when dissolving the PVA film.

Examples of the starch include natural starches such as a corn starch, a potato starch, a sweet potato starch, a wheat starch, a rice starch, a tapioca starch, and a sago starch; and processed starches subjected to etherification processing, esterification processing, and oxidation processing, and particularly, the processed starches are preferable.

The content of starch in the PVA film is preferably 15 parts by mass or less, and more preferably 10 parts by mass or less, with respect to 100 parts by mass of the PVA (A). When the amount of starch is more than 15 parts by mass, there is a possibility that the process passability at the time of producing a PVA film is deteriorated.

Examples of the water-soluble polymer other than PVA (A) include dextrin, gelatin, glue, casein, shellac, gum arabic, polyacrylic acid amide, sodium polyacrylate, polyvinyl methyl ether, a copolymer of methyl vinyl ether and maleic anhydride, a copolymer of vinyl acetate and itaconic acid, polyvinyl pyrrolidone, cellulose, acetyl cellulose, acetyl butyl cellulose, carboxymethyl cellulose, methyl cellulose, ethyl cellulose, hydroxyethyl cellulose, and sodium alginate.

The content of the water-soluble polymer other than the PVA (A) in the PVA film is preferably 15 parts by mass or less, and more preferably 10 parts by mass or less, with respect to 100 parts by mass of the PVA (A). When the content of the water-soluble polymer other than the PVA (A) is more than 15 parts by mass, the physical properties of the PVA film may be impaired.

Surfactant

In film forming of a PVA film, it is preferable to add a surfactant to the PVA film from the viewpoint of handleability thereof and improvement of releasability from a film forming apparatus in the production of the PVA film. Examples of the surfactant include an anionic surfactant and a nonionic surfactant.

Examples of the anionic surfactant include carboxylic acid type surfactants such as potassium laurate; sulfuric acid ester type surfactants such as octyl sulfate; and a sulfonic acid type surfactants such as dodecylbenzenesulfonate.

Examples of the nonionic surfactant include alkyl ether type surfactants such as polyoxyethylene lauryl ether and polyoxyethylene oleyl ether; alkylphenyl ether type surfactants such as polyoxyethylene octylphenyl ether; alkyl ester type surfactants such as polyoxyethylene laurate; alkylamine type surfactants such as polyoxyethylene laurylamino ether; alkylamide type surfactants such as polyoxyethylene lauric acid amide; polypropylene glycol ether type surfactants such as polyoxyethylene polyoxypropylene ether; alkanolamide type surfactants such as lauric acid diethanolamide and oleic acid diethanolamide; and allyl phenyl ether type surfactants such as polyoxyalkylene allyl phenyl ether.

The surfactant may be used singly or in combination of two or more kinds thereof.

Other Components

The PVA film of the present invention may contain components such as moisture, an antioxidant, an ultraviolet absorber, a lubricant, a crosslinking agent, a colorant, a filler, an antiseptic, an antifungal agent, and other polymer compounds in addition to a plasticizer, starch, a water-soluble polymer other than the PVA (A), and a surfactant as long as the effect of the present invention is not hindered. The ratio of the total mass of a PVA, plasticizer, starch, water-soluble polymer other than PVA (A), and surfactant to the total mass of the PVA film of the present invention is preferably within the range of 60 to 100 mass %, more preferably within the range of 80 to 100 mass %, and still more preferably within the range of 90 to 100 mass %.

Form

The thickness of the PVA film of the present invention is not particularly limited, but the thickness of the PVA film is preferably 200 μm or less, more preferably 150 μm or less, still more preferably 100 μm or less, and still more preferably 50 μm or less because if the thickness is too thick, secondary processability tends to be deteriorated. When the thickness is too thin, there is a possibility that a problem occurs in the mechanical strength of the PVA film. Therefore, the thickness of the PVA film is preferably 5 μm or more, more preferably 10 μm or more, still more preferably 15 μm or more, and particularly preferably 20 μm or more. The thickness of the PVA film can be obtained as an average value of thicknesses measured at 10 arbitrary positions (for example, 10 arbitrary points on a straight line drawn in the length direction of the PVA film).

Application

The PVA film of the present invention is used as a raw fabric film for producing an optical film or a water-soluble film. Examples of the optical film include a polarizing film, a viewing angle improving film, a retardation film, and a brightness improving film, and the polarizing film is preferable. Examples of the water-soluble film include a film for drug packaging, a base film for hydraulic transfer, a base film for embroidering, a release film for molding artificial marble, a film for seed packaging, and a film for waste storage bag, and the film for drug packaging is preferable. Examples of the type of the drug include detergents, agricultural chemicals, and disinfectants. The form of the drug may be any of a powder form, a lump form, a gel form, and a liquid form. A package can be obtained by packaging a drug using the PVA film of the present invention as a film for drug packaging. By using this package, it is possible to use a certain amount of a drug easily and safely when washing clothes using a detergent in general households or spraying a pesticide on a paddy field in agricultural works.

Method for Producing PVA Film

In the present invention, a PVA film can be produced by any method, such as a method for film forming by a flow-casting film forming method, a wet film forming method (ejection into a poor solvent), a dry-wet film forming method, a gel film forming method (method in which the film forming stock solution is once cooled and gelled, and then the solvent is extracted and removed to obtain a PVA film) or a combination of these methods, a melt extrusion film forming method, in which an extruder is used to obtain the above film forming stock solution, and the film is extruded from a T-die, or an inflation molding method using a film forming stock solution homogenized by adding solvent and additives to PVA (A). Among them, a flow-casting film forming method and a melt extrusion film forming method are preferable because a homogeneous film can be obtained with high productivity. Hereinafter, a flow-casting film forming method or a melt extrusion film forming method for a PVA film is described.

When a PVA film is formed by a flow-casting film forming method or a melt extrusion film forming method, the above-mentioned film forming stock solution is spilled onto a support such as a metal roll or a metal belt in the form of a film, and is heated to remove a solvent, thereby solidifying and forming a film. The solidified film is released from the support, dried by a drying roll, a drying furnace, or the like as necessary, further heat-treated as necessary, and wound up, whereby a long PVA film in a roll shape can be obtained.

The volatile content concentration (concentration of volatile components such as a solvent removed by volatilization or evaporation during film forming or the like) of the film forming stock solution is preferably 50 mass % or more, and more preferably 55 mass % or more. The volatile content concentration of the film forming stock solution is preferably 90 mass % or less, and more preferably 80 mass % or less. When the volatile content concentration is less than 50 mass %, the viscosity of the film forming stock solution increases, and film forming may be difficult. On the other hand, when the volatile content concentration exceeds 90 mass %, the viscosity becomes low, and the thickness uniformity of the resulting film is easily impaired.

Here, the "volatile fraction of the film forming stock solution" in the present specification refers to a volatile fraction determined by the following formula.

Volatile fraction (mass %) of film forming stock solution=$\{(Wa-Wb)/Wa\}\times 100$ (In the formula, Wa represents the mass (g) of the film forming stock solution, and Wb represents the mass (g) when the film forming stock solution of Wa (g) is dried in an electrothermal dryer at 105° C. for 16 hours.)

The method for adjusting the film forming stock solution is not particularly limited, and examples thereof include a method in which PVA and additives such as a plasticizer and a surfactant are dissolved in a dissolution tank, and a method in which PVA in a water-containing state is melt-kneaded together with a plasticizer, a surfactant, and the like when the PVA is melt-kneaded using a single screw extruder or a twin screw extruder.

When a PVA film is formed by a flow-casting film forming method or a melt extrusion film forming method, the film forming stock solution is spilled from a film-like discharge device onto a support such as a metal roll or a metal belt in the form of a film, and is heated to remove a solvent, thereby solidifying and forming a film.

The surface temperature of the support on which the film forming stock solution is spilled is preferably 50° C. or higher, more preferably 60° C. or higher, and still more preferably 65° C. or higher. The surface temperature of the support on which the film forming stock solution is spilled is preferably 110° C. or lower, more preferably 100° C. or lower, and still more preferably 95° C. or lower. When the surface temperature is lower than 50° C., the time required for drying becomes long, and productivity tends to decrease. When the surface temperature exceeds 110° C., there are tendencies that the film surface abnormality such as foaming is likely to occur and the film becomes too hard.

While the PVA film is heated on the support, hot air having an air velocity of 1 to 10 m/s may be uniformly blown to the entire region on the non-contact surface side of the PVA film to adjust the drying rate. The temperature of the hot air blown onto the non-contact surface side is preferably 50° C. or higher, and more preferably 70° C. or higher from the viewpoint of drying efficiency, uniformity of drying, and the like. The temperature of the hot air blown onto the non-contact surface side is preferably 150° C. or lower, and more preferably 120° C. or lower from the viewpoint of drying efficiency, uniformity of drying, and the like.

The PVA film released from the support is dried on the support preferably to a volatile fraction of 5 to 50 mass %, then released, and further dried if necessary. The drying method is not particularly limited, and examples thereof include a method of contacting with a drying furnace or a drying roll. In the case of drying with a plurality of drying rolls, it is preferable to bring one surface and the other surface of the film alternately into contact with the drying rolls in order to make both surfaces uniform. The number of the drying rolls is preferably 3 or more, more preferably 4 or more, and still more preferably 5 or more. The number of drying rolls is preferably 30 or less. The upper limit of the temperature of the drying furnace and the drying roll is preferably 110° C. or lower, more preferably 100° C. or lower, more preferably 90° C. or lower, and still more preferably 85° C. or lower. If the temperature of the drying furnace and the drying roll is too high, the film may become too hard. On the other hand, the lower limit of the temperature of the drying furnace and the drying roll is preferably 40° C. or higher, more preferably 45° C. or higher, and still more preferably 50° C. or higher. When the temperature of the drying furnace and the drying roll is too low, productivity may be deteriorated.

The dried PVA film can be further subjected to heat treatment as necessary. By performing the heat treatment, physical properties such as strength, water solubility, and birefringence of the PVA film can be adjusted. The lower limit of the heat treatment temperature is preferably 60° C. or higher. The upper limit of the heat treatment temperature is preferably 135° C. or lower, and more preferably 130° C. or lower. If the heat treatment temperature is too high, the film may become too hard.

If necessary, the PVA film produced in this way is further subjected to a humidity control treatment, cut at both ends (lugs) of the film, and wound into a roll shape on a cylindrical core, and is subjected to moisture-proof packaging to obtain a product.

The volatile fraction of the finally obtained PVA film by the series of treatments described above is not necessarily limited. The volatile fraction of the PVA film is preferably 1 mass % or more, and more preferably 2 mass % or more. The volatile fraction of the PVA film is preferably 5 mass % or less, and more preferably 4 mass % or less.

Discrimination Method

The PVA film obtained by the above method can be discriminated between a PVA film containing a PVA (Ab) in which all or a part of carbon is derived from bio-derived ethylene (Bb) and a PVA film containing only a PVA (Ap) derived only from fossil fuel-derived ethylene (Bp) by measuring the abundance ratio of carbon 14 ($^{14}$C) in total carbon, that is, $^{14}$C/C.

In the present invention, the PVA (Ap) derived only from fossil fuel-derived ethylene (Bp) means that the PVA (Ab) is not contained in which all or a part of carbon is derived from bio-derived ethylene (Bb), and is not a concept of excluding the PVA (Ap) containing monomer units other than fossil fuel-derived ethylene (Bp). In the present invention, the PVA film containing only the PVA (Ap) means not containing the PVA (Ab) derived from bio-derived ethylene (Bb), and is not a concept of excluding a PVA film containing components other than the PVA (Ap).

In addition, by measuring the abundance ratio 14 ($^{14}$C) of carbon in the total carbon, that is, $^{14}$C/C, it is possible to discriminate a PVA film containing a PVA (Ab) in which all or a part of carbon is derived from bio-derived ethylene (Bb) from a PVA film, different from the PVA film, containing a PVA (Ab) in which all or a part of carbon is derived from bio-derived ethylene (Bb). For example, even in a PVA film partially containing a PVA (Ab) derived from the same plant-derived ethylene (Bb), if the ratio of a PVA (Ab) derived from bio-derived ethylene (Bb) and PVA (Ap) obtained only from a fossil fuel-derived raw material is different, the abundance ratio $^{14}$C/C is different. For example, when a PVA film produced by own company is produced so that the abundance ratio of carbon 14 ($^{14}$C) in the total carbon, that is, $^{14}$C/C is constant, it is possible to discriminate whether the PVA film is a PVA film produced by own company or a PVA film produced by another company. In addition, even in the same company, production is performed so that the abundance ratio of carbon 14 ($^{14}$C), that is, $^{14}$C/C varies depending on the production site, the production date, and the production lot, whereby the production site, the production date, and the production lot of the PVA film can be specified by measuring the abundance ratio of carbon 14 ($^{14}$C), that is, $^{14}$C/C.

In order to discriminate the PVA film, the PVA film is preferably produced so that the abundance ratio of $^{14}$C in the total carbon, that is, $^{14}$C/C is $1.0 \times 10^{-14}$ or more, more preferably $5.0 \times 10^{-14}$ or more, and still more preferably $2.0 \times 10^{-14}$ or more. In addition, since a bio-derived raw material is generally more expensive than a fossil fuel-derived raw material, in order to discriminate a PVA film, it is preferable to produce a PVA film so that the abundance ratio of $^{14}$C in total carbon, that is, $^{14}$C/C, is $1.0'10^{-11}$ or less, more preferably $5.0 \times 10^{-12}$ or less, and still more preferably $0.1 \times 10^{-14}$ or less.

Furthermore, by measuring the abundance ratio of carbon 14 ($^{14}C$) in the total carbon, that is, $^{14}C/C$, it is possible to discriminate whether bio-derived ethylene (Bb) is C3 plant-derived ethylene (Bb) or C4 plant-derived ethylene (Bb) by measuring the carbon stable isotope ratio $\delta^{13}C$ of carbon 13 ($^{13}C$) for a PVA film that has been discriminated to contain PVA (Ab) derived from bio-derived ethylene (Bb). More specifically, bio-derived ethylene (Bb) is discriminated as C4 plant-derived ethylene (Bb) when a carbon stable isotope ratio $\delta^{13}C$ of ($^{13}C$) of carbon 13 is −20% or more, and bio-derived ethylene (Bb) is discriminated as C3 plant-derived ethylene (Bb) when the carbon stable isotope ratio $\delta^{13}C$ is less than −20%. By measuring the abundance ratio of carbon 14 ($^{14}C$) in the total carbon, that is, $^{14}C/C$, and the carbon stable isotope ratio of carbon 13 ($^{13}C$), that is, $\delta^{13}C$, PVA films can be discriminated with higher accuracy.

In the above description, the abundance ratio of carbon 14 ($^{14}C$) in total carbon, that is, $^{14}C/C$ is measured, and then the carbon stable isotope ratio $\delta^{13}C$ of carbon 13 ($^{13}C$) is measured for one that is discriminated to be a PVA film containing a PVA (Ab) derived from bio-derived ethylene (Bb). However, the abundance ratio of carbon 14 ($^{14}C$), that is, $^{14}C/C$ is not measured, the carbon stable isotope ratio $\delta^{3}C$ of carbon 13 ($^{13}C$) is measured, and as a result, a PVA film containing a PVA (Ab) in which all or a part of carbon is derived from bio-derived ethylene (Bb) can be discriminated from other PVA films different from the PVA film. For example, it is possible to discriminate a PVA film containing a PVA (Ab) derived from bio-derived ethylene (Bb) from a PVA film containing only PVA (Ap) obtained from only a fossil fuel-derived raw material. However, since the carbon stable isotope ratio $\delta^{13}C$ of a PVA (Ap) obtained only from a fossil fuel-derived raw material is generally less than −20%, it may be difficult to discriminate a PVA film containing a PVA (Ab) obtained from C3 plant-derived ethylene (Bb) as a raw material from a PVA film containing only PVA (Ap) obtained only from a fossil fuel-derived raw material.

Further, it is also possible to discriminate a PVA film containing a PVA (Ab) derived from bio-derived ethylene (Bb) from a PVA film containing a PVA (Ab) different from the PVA film and derived from bio-derived ethylene (Bb).

As described above, when the mixing ratio of a bio-PVA and a fossil fuel-derived PVA of a PVA to be used is changed for each production line of a PVA film, it is possible to specify which production line of a PVA film is used as a raw material for the polarizing film used by analyzing a polarizing plate of an LCD product available in a consumer market.

Application

As described above, the PVA film of the present invention can be suitably used for optical applications such as a raw material of a polarizing film. It can also be suitably used for the application of a water-soluble film such as drug packaging and a seed tape.

EXAMPLES

Hereinafter, the present invention is specifically described with reference to Examples and the like, but the present invention is not limited by the following Examples at all.

Purification of PVA Film

A PVA film roll obtained in the following Examples or Comparative Examples was unwound to collect about 5 g of a film, and the film was cut into a small piece. Then, the cut PVA film was extracted with a Soxhlet abstractor using chloroform. By sufficiently removing components other than a PVA in the PVA film in this manner, the PVA film was purified to obtain a PVA in the PVA film.

Measurement of Abundance Ratio of Carbon 14 ($^{14}C$) in Total Carbon of PVA in PVA Film, that is, $^{14}C/C$ The PVA obtained in the above [Purification of PVA Film] was subjected to $CO_2$ conversion by a pretreatment method (ASTM D6866/Method B) specified by American Society of Testing and Materials, and then subjected to C (graphite) conversion by a complete reduction treatment using an iron catalyst. Next, the carbon isotope ratio ($^{14}C/^{12}C$ ratio, $^{13}C/^{12}C$ ratio) of the purified PVA film and the standard substance was measured by an accelerator mass spectrometry, and the $^{12}C$ concentration, the $^{13}C$ concentration, and the $^{14}C$ concentration were determined from the measurement results. Then, the obtained $^{14}C$ concentration was divided by the total carbon concentration (total of $^{12}C$ concentration, $^{13}C$ concentration, and $^{14}C$ concentration) to calculate $^{14}C/C$ of a PVA in the PVA film. Here, as a standard substance, graphite synthesized from an oxalic acid standard substance (HOxII) provided by National Institute of Standards and Technology was used. The measurement limit of $^{14}C/C$ in this measurement is less than $1.0 \times 10^{-14}$.

Measurement of Carbon Stable Isotope Ratio $\delta^{13}C$ of PVA in PVA Film

The PVA obtained in the above [Purification of PVA Film] was subjected to $CO_2$ conversion by a pretreatment method (ASTM D6866/Method B) specified by American Society of Testing and Materials, and then subjected to C (graphite) conversion by a complete reduction treatment using an iron catalyst. Next, the carbon isotope ratio ($^{13}C/^{12}C$ ratio) of the purified PVA film and the standard substance was measured by an accelerator mass spectrometry. Then, the carbon stable isotope ratio $\delta^{13}C$ was calculated by the following formula. Here, PDB ("Pee Dee Belemnite") was used as the standard substance.

$$\delta^{13}C[\%] = \{(^{13}C/^{12}C)_{sample}/(^{13}C/^{12}C)_{PDB} - 1.0\} \times 1,000$$

In the above formula, $[(^{13}C/^{12}C)_{sample}]$ represents a carbon isotope ratio ($^{13}C/^{12}C$ ratio) of the purified PVA film to be measured, and $[(^{13}C/^{12}C)_{PDB}]$ represents a carbon isotope ratio ($^{13}C/^{12}C$ ratio) of PDB as a standard substance.

Measurement of Ethylene Unit Content, Alkoxyl Group Content, 1,2-Glycol Bond Content, and Degree of Saponification of PVA in PVA Film The PVA obtained in the above [Purification of PVA Film] was dissolved in dimethyl sulfoxide (DMSO-$d_6$), and then the solution was added to acetone to precipitate a PVA, thereby further purifying the PVA. One to two drops of trifluoroacetic acid (TFA) was added dropwise to the DMSO-$d_6$ solution of the PVA, and the obtained sample was immediately subjected to NMR measurement under the following conditions. From the obtained NMR spectrum, the ethylene unit content, the alkoxyl group content, the 1,2-glycol bond content, and the degree of saponification of a PVA in the PVA film were determined.

NMR Measurement Conditions

Apparatus used: Superconducting nuclear magnetic resonance apparatus "Lambda 500" manufactured by JEOL Ltd.

Solvent: DMSO-$d_6$ (TFA dropwise addition)
Concentration: 5 mass %
Temperature: 80° C.
Resonance frequency: 1H 500 MHz
Flip angle: 45°
Pulse delay time: 4.0 seconds
Number of integrations: 6000 times Measurement of Stretching Limit Temperature of PVA Film A rectangular test piece having a width direction of 30 mm and a flow direction of 60 mm was taken from the central part in the width direction of the PVA film roll obtained in the following Examples or Comparative Examples. This test piece was set in a tensile tester at a chuck interval of 15 mm, and then stretched in a constant-temperature water bath set at a predetermined temperature to measure a percent of stretch at the time of breaking. This procedure was repeated 3 times, and the average value of the percent of stretch at the time of breaking was determined. When the average value was 6.5 times or more, the temperature of the constant-temperature water bath was lowered by 1° C., and when the average value was less than 6.5 times, the temperature of the constant-temperature water bath was raised by 1° C., and a limit temperature at which the average value of the percent of stretch at the time of breaking was 6.5 times or more (minimum temperature at which the average value was 6.5 times or more) was determined.

Evaluation of the Number of Foreign Matters in Polarizing Film

A polarizing film roll obtained in the following Examples or Comparative Examples was unwound and cut into a size of 30 cm in the length direction (stretching direction) and 20 cm in the width direction. The blue foreign matter existing on the surface of the cut polarizing film was visually observed, and the number of foreign matters having a longest diameter of 5 to 500 μm (pieces/600 cm$^2$) was determined. This procedure was repeated 3 times to obtain an average value (pieces/600 cm$^2$) of the number of foreign matters. The longest diameter of the foreign matter was measured using a differential interference microscope (magnification: 200 times). In the following Examples or Comparative Examples, since the polarizing film after the drying treatment is continuously wound for 6 hours, the cut polarizing film is a sample after about 6 hours from the start of production of the polarizing film.

Measurement of Degree of Polarization of Polarizing Film

A polarizing film roll obtained in the following Examples or Comparative Examples was unwound and cut into a size of 30 cm in the length direction (stretching direction) and 20 cm in the width direction. Two square samples of 1.5 cm in the length direction (stretching direction) and 1.5 cm in the width direction of the cut polarizing film were taken from the central part in the width direction of the polarizing film, and the light transmittance ($Y_\parallel$) in the case of overlapping the samples such that the length direction (stretching direction) was parallel and the light transmittance ($Y_\perp$) in the case of overlapping the samples such that the length direction (stretching direction) was orthogonal were measured by the same method as the above transmittance measurement method, and the degree of polarization (V) (%) was determined from the following formula.

$$\text{Degree of polarization }(V)(\%) = \{(Y_\parallel - Y_\perp)/(Y_\parallel + Y_\perp)\}^{1/2} \times 100$$

Example 1

(1) Synthesis of Vinyl Acetate

After impregnating 23 g (water absorption 19.7 g) of the silica sphere carrier "HSV-I" (manufactured by Shanghai Haiyuan Chemical Industry Technology Co., Ltd.) (sphere diameter: 5 mm, specific surface area: 160 m$^2$/g, water absorption: 0.75 g/g) with an aqueous solution equivalent to the amount of water absorbed by the carrier, which contains 1.5 g of a 56 mass % sodium tetrachloropallastate aqueous solution and 1.5 g of a 17 mass % hydrogen tetrachloroaurate tetrahydrate aqueous solution, and then the silica sphere carrier was immersed in 40 mL of an aqueous solution containing 2.5 g of sodium metasilicate nonahydrate and allowed to stand for 20 hours. Subsequently, 3.3 mL of a 52 mass % hydrazine hydrate aqueous solution was added, and the resulting mixture was allowed to stand at room temperature for 4 hours, then washed with water until chloride ions disappeared from water, and dried at 110° C. for 4 hours. The resulting palladium/gold/carrier composition was immersed in 60 mL of a 1.7 mass % acetic acid aqueous solution and allowed to stand for 16 hours. Then, the composition was washed with water for 16 hours and dried at 110° C. for 4 hours. Thereafter, 2 g of an aqueous solution equivalent to the amount of water absorbed by the carrier of potassium acetate was impregnated, and dried at 110° C. for 4 hours to obtain a vinyl acetate synthesis catalyst.

The obtained catalyst (3 mL) was diluted with 75 mL of glass beads and filled in a SUS316L reaction tube (inner diameter 22 mm, length 480 mm, and then the reaction was carried out by circulating a gas mixed at a reaction temperature of 150° C. and a reaction pressure of 0.6 MPaG at a ratio of ethylene/oxygen/water/acetic acid/nitrogen=47.3/6.1/5.6/26.3/14.7 (mol %) at a flow rate of 20 NL/hour. Here, bio-ethylene derived from a sugar cane (manufactured by Braskem S.A.) was used as ethylene. The obtained reaction gas containing vinyl acetate was purified to obtain vinyl acetate.

(2) Synthesis of PVA

Using the obtained vinyl acetate as a monomer, 2,2'-azobis-(4-methoxy-2,4-dimethylvaleronitrile) as a polymerization initiator, and methanol as a solvent, polymerization was performed at a polymerization temperature of 60° C. by a known method, and then 2,4-diphenyl-4-methyl-1-pentene (DPMP) as a compound having a conjugated double bond and a molecular weight of 1000 or less was added in an amount of 2 mol per 1 mol of the polymerization initiator used. The polymerization time was adjusted in accordance with the target degree of polymerization. A 6 mass % methanol solution of sodium hydroxide was added to the obtained methanol solution of polyvinyl acetate under stirring so that the molar ratio of sodium hydroxide to vinyl acetate units of polyvinyl acetate was 0.023, and a saponification reaction was started at 30° C. As the saponification reaction proceeded, a gelated product was produced. When 50 minutes had elapsed from the start of the saponification reaction, the gelated product was pulverized to obtain a PVA (PVA-1) swollen with methanol. This PVA-1 was washed with 5 times its mass of methanol and then dried with hot air at 55° C. for 1 hour and at 100° C. for 2 hours.

(3) Production of PVA Film and PVA Film Roll

An aqueous solution (PVA concentration: 15 mass %) containing 100 parts by mass of the obtained PVA-1, 12 parts by mass of glycerin, and 0.1 parts by mass of lauric acid diethanolamide was prepared as a film forming stock solution of the PVA film. The film forming stock solution was discharged from a slit die onto a first metal roll having a diameter of 2 m and adjusted to a surface temperature of 90° C., and dried to release the film having a moisture content of 12 mass % from the metal roll. Subsequently, the film surface not in contact with the first metal roll was brought into contact with a second metal roll having a surface temperature of 70° C. and a diameter of 1 m, and the film was dried. Further, the film was sequentially brought into contact with a third to sixth metal rolls (surface temperature: 80 to 120° C., diameter: 1 m) so that one surface and the other surface of the film were alternately brought into contact with the metal rolls, dried, and wound up to obtain a roll-shaped product of the PVA film (PVA film roll) having a width of 0.6 m, a length of 1000 m, and a thickness of 30 µm.

(4) Production of Polarizing Film

The obtained PVA film roll was unwound, and subjected to a swelling treatment, a dyeing treatment, a crosslinking treatment, a stretching treatment, a washing treatment, and a drying treatment in this order to continuously produce a polarizing film. The swelling treatment was performed by immersing the PVA film in a swelling treatment tank with a treatment liquid (pure water) at 30° C. and uniaxially stretching the film 1.72 times in the length direction during the immersion. The dyeing treatment was performed by immersing the PVA film in a swelling treatment tank with a treatment liquid (aqueous solution of 2.8 mass % of boric acid and 5 mass % of potassium iodide) at 32° C., and uniaxially stretching the film 1.37 times in the length direction during the immersion. The crosslinking treatment was performed by immersing the PVA film in a swelling treatment tank with a crosslinking treatment liquid (aqueous solution of 2.6 mass % boric acid) at 32° C., and uniaxially stretching the film 1.12 times in the length direction during the immersion. The stretching treatment was performed by uniaxially stretching the PVA film 2.31 times in the length direction in a swelling treatment tank with a stretching treatment liquid (aqueous solution of 2.8 mass % of boric acid and 5 mass % of potassium iodide) at 55° C. The washing treatment was performed by immersing the PVA film in a washing treatment tank with a washing treatment liquid (aqueous solution of 1.5 mass % of boric acid and 5 mass % of potassium iodide) at 22° C. for 12 seconds. The drying treatment was performed by drying the PVA film at 60° C. for 1.5 minutes. Here, the PVA film was not stretched between the washing treatment and the drying treatment. In this way, the obtained PVA film roll was unwound to continuously produce a polarizing film.

(5) Production of Polarizing Film Roll

Two square samples of 1.5 cm in the length direction (stretching direction) and 1.5 cm in the width direction of the obtained polarizing film were collected from the central part in the width direction of the polarizing film, and for each sample, the visibility correction of the visible light region of the C light source and the visual field of 2 degrees was performed in accordance with JIS Z8722 (Method for measuring object color) using a spectrophotometer V-7100 (with integrating sphere) manufactured by Hitachi, Ltd., and for one polarizing film sample, the light transmittance when the sample is tilted 45 degrees with respect to the stretching axis direction and the light transmittance when the sample is tilted −45 degrees were measured, and the average value (Y1) thereof was obtained.

For the other polarizing film sample, the light transmittance when the sample is tilted 45 degrees and the light transmittance when the sample is tilted −45 degrees were measured in the same manner as described above, and the average value (Y2) thereof was obtained. The value of Y1 and Y2 obtained above were averaged to obtain the transmittance (Y) (%) of the polarizing film.

The concentrations of iodine and potassium iodide in the swelling treatment tank were adjusted so that the transmittance was 43.5%, and then the polarizing film after the drying treatment was continuously wound for 6 hours to obtain a roll-shaped product of the polarizing film (polarizing film roll).

The PVA film roll and the polarizing film roll thus obtained were measured and evaluated by the method described above. The measurement and evaluation results are shown in Table 2. The raw materials and polymerization conditions of a PVA are shown in Table 1.

Example 2

The same procedure as in Example 1 was carried out to obtain a PVA (PVA-2) except that the polymerization initiator used in the "(2) Synthesis of PVA" was changed to azobisisobutyronitrile. Then, a PVA film roll and a polarizing film roll were produced, measured, and evaluated in the same manner as in Example 1 except that PVA-2 was used. The measurement and evaluation results are shown in Table 2. The raw materials and polymerization conditions of a PVA are shown in Table 1.

Example 3

The same procedure as in Example 1 was carried out to obtain a PVA (PVA-3) except that the polymerization temperature of a PVA was changed to 90° C. in "(2) Synthesis of PVA". Then, a PVA film roll and a polarizing film roll were produced, measured, and evaluated in the same manner as in Example 1 except that PVA-3 was used. The measurement and evaluation results are shown in Table 2. The raw materials and polymerization conditions of a PVA are shown in Table 1.

Comparative Example 1

The same procedure as in Example 1 was carried out to obtain a PVA (PVA-4) except that ethylene used in the "(1) Synthesis of vinyl acetate" was changed to petroleum-derived ethylene (manufactured by AIR LIQUIDE Kogyo Gas Ltd.). Then, a PVA film roll and a polarizing film roll were produced, measured, and evaluated in the same manner as in Example 1 except that PVA-4 was used. The measurement and evaluation results are shown in Table 2. The raw materials and polymerization conditions of a PVA are shown in Table 1.

Example 4

A PVA film roll and a polarizing film roll were produced, measured, and evaluated in the same manner as in Example 1 except that the PVA used in the above "(3) Production of a PVA film and PVA film roll" is changed to the PVA obtained by mixing the PVA-4 obtained in Comparative Example 1 and the PVA-1 obtained in Example 1 at a mass ratio of 1:1. The measurement and evaluation results are shown in Table 2. The raw materials and polymerization conditions of a PVA are shown in Table 1.

Example 5

PVA (PVA-5) was obtained in the same manner as in Example 1 except that 5.7 parts by mass of sugar cane-derived bio-ethylene (manufactured by Braskem S.A.) was added as a monomer used in the above "(2) Synthesis of PVA", with respect to 100 parts by mass of vinyl acetate, and a polymerization reaction was performed while the pressure in the reaction vessel was maintained at 0.03 MPaG. Then, a PVA film roll and a polarizing film roll were produced, measured, and evaluated in the same manner as in Example 1 except that PVA-5 was used. The measurement and evaluation results are shown in Table 2. The raw materials and polymerization conditions of a PVA are shown in Table 1.

Example 6

Rice, a C3 plant, was subjected to an alkali treatment step, a saccharification treatment step, and an ethanolization step to obtain rice-derived ethanol. The ethanol was subjected to a dehydration reaction treatment at 190° C. using mordenite as a catalyst to produce rice-derived bio-ethylene.

Then, PVA (PVA-6) was obtained in the same manner as in Example 1 except that ethylene used in the "(1) Synthesis of vinyl acetate" was changed to rice-derived bio-ethylene. Then, a PVA film roll and a polarizing film roll were produced, measured, and evaluated in the same manner as in Example 1 except that PVA-6 was used. The measurement and evaluation results are shown in Table 2. The raw materials and polymerization conditions of a PVA are shown in Table 1.

TABLE 1

| | Ethylene as raw material for vinyl acetate | | Polymerization catalyst[*1] | Polymerization temperature ° C. | Amount of ethylene to co-polymerize[*2] Parts by mass |
|---|---|---|---|---|---|
| Unit | Derivation | Plant | | | |
| PVA-1 | Bio | Sugar cane | AMV | 60 | — |
| PVA-2 | Bio | Sugar cane | AIBN | 60 | — |
| PVA-3 | Bio | Sugar cane | AMV | 90 | — |
| PVA-4 | Petroleum | — | AMV | 60 | — |
| PVA-5 | Bio | Sugar cane | AMV | 60 | 5.7 |
| PVA-6 | Bio | Rice | AMV | 60 | — |

[*1]AMV: 2,2'-azobis-(4-methoxy-2,4-dimethylvaleronitrile) AIBN: Azobisisobutyronitrile
[*2]Mass with respect to 100 parts by mass of vinyl acetate

TABLE 2

| | | PVA film | | | | | | | | Polarizing film Evaluation of polarizing film |
|---|---|---|---|---|---|---|---|---|---|---|
| | | PVA | | | | | | Evaluation of PVA film Stretching limit temperature ° C. | Average value of number of foreign matters pieces/600 cm² | Degree of polarization % |
| Unit | Kind | Degree of polymerization | Degree of saponification mol % | Content of ethylene unit mol % | Content of alkoxyl group mol % | Content of 1,2-glycol bond mol % | $^{14}$C./C. | $\delta^{13}$C. ‰ | | |
| Example 1 | PVA-1 | 2430 | 99.9 | 0 | 0.01 | 1.4 | $9.5 \times 10^{-13}$ | −11 | 63 | 0 | 99.99 |
| Example 2 | PVA-2 | 2400 | 99.9 | 0 | 0 | 1.4 | $9.1 \times 10^{-13}$ | −13 | 63 | 2.6 | 99.99 |
| Example 3 | PVA-3 | 2420 | 99.9 | 0 | 0.01 | 1.6 | $9.4 \times 10^{-13}$ | −12 | 62 | 0.3 | 99.98 |
| Example 4* | PVA-1 + PVA-4 | 2430 | 99.9 | 0 | 0.01 | 1.4 | $4.8 \times 10^{-13}$ | −18 | 63 | 0 | 99.99 |
| Example 5 | PVA-5 | 2400 | 99.9 | 3.8 | 0.01 | 1.3 | $9.6 \times 10^{-13}$ | −11 | 68 | 0.3 | 99.99 |
| Example 6 | PVA-6 | 2420 | 99.9 | 0 | 0.01 | 1.4 | $1.1 \times 10^{-12}$ | −36 | 63 | 0 | 99.99 |
| Comparative Example 1 | PVA-4 | 2430 | 99.9 | 0 | 0.01 | 1.4 | Lower than measurement limit | −26 | 63 | 0 | 99.99 |

*Use PVA obtained by mixing PVA-1 and PVA-4 at a mass ratio of 1:1

The invention claimed is:

1. An optical film which comprises a polyvinyl resin film comprising a polyvinyl alcohol resin (A), wherein
   an abundance ratio of carbon 14 ($^{14}$C) in total carbon constituting the polyvinyl alcohol resin (A), ($^{14}$C/C) is $1.0 \times 10^{-14}$ or more,
   the polyvinyl alcohol resin (A) does not comprise a unit derived from ethylene,
   the polyvinyl alcohol resin (A) has a content of a 1,2-glycol bond of 0.2 mol % or more and less than 2.0 mol %,
   the polyvinyl alcohol resin (A) has an alkoxyl group at a polymer terminal, wherein a content of the alkoxyl group with respect to total monomer units of the polyvinyl alcohol resin (A) is 0,0005 mol % to less than 1 mol %, and
   the polyvinyl alcohol rein (A) is derived from a polyvinyl ester, and a content of another monomer unit copolymerizable with a vinyl ester monomer to all monomer units of the polyvinyl ester is 15 mol % or less.

2. The optical film according to claim 1, wherein a carbon stable isotope ratio $\delta^{13}$C of carbon 13 ($^{13}$C) of the polyvinyl alcohol resin (A) is −20‰ or more.

3. The optical film according to claim 1, wherein a carbon stable isotope ratio $\delta^{13}C$ of carbon 13 ($^{13}C$) of the polyvinyl alcohol resin (A) is less than −20‰.

4. The optical film according to claim 1, wherein at least a part of the polyvinyl alcohol resin (A) is a polyvinyl alcohol resin (Ab) in which at least a part of carbon is derived from bio-derived ethylene (Bb).

5. The optical film according to claim 1, wherein the polyvinyl alcohol resin (A) has a degree of saponification of 80 mol % or more.

6. The optical film according to claim 1, wherein the polyvinyl alcohol resin (A) has a degree of polymerization of from 200 to less than 8,000.

7. A package comprising a water soluble film which comprises a polyvinyl resin film containing a polyvinyl alcohol resin (A), wherein an abundance ratio of carbon 14 ($^{14}C$) in total carbon constituting the polyvinyl alcohol resin (A), ($^{14}C/C$) is $1.0 \times 10^{-14}$ or more, the polyvinyl alcohol resin (A) has a content of a 1,2-glycol bond of 0.2 mol % or more and less than 1.6 mol %, the polyvinyl alcohol resin (A) has an alkoxyl group at a polymer terminal, wherein a content of the alkoxyl group with respect to total monomer units of the polyvinyl alcohol resin (A) is 0.0005 mol % to less than 1 mol %, and the polyvinyl alcohol rein (A) is derived from a polyvinyl ester, and a content of another monomer unit copolymerizable with a vinyl ester monomer to all monomer units of the polyvinyl ester is 15 mol % or less, wherein the package is suitable to contain a detergent, an agricultural chemical or a disinfectant.

8. The package according to claim 7, wherein a carbon stable isotope ratio $\delta^{13}C$ of carbon 13 ($^{13}C$) of the polyvinyl alcohol resin (A) is −20‰ or more.

9. The package according to claim 7, wherein a carbon stable isotope ratio $\delta^{13}C$ of carbon 13 ($^{13}C$) of the polyvinyl alcohol resin film is less than −20‰.

10. The package according to claim 7, wherein at least a part of the polyvinyl alcohol resin (A) is a polyvinyl alcohol resin (Ab) in which at least a part of carbon is derived from bio-derived ethylene (Bb).

11. The package according to claim 7, wherein the polyvinyl alcohol resin (A) contains an ethylene unit, and a content of the ethylene unit with respect to total monomer units of the polyvinyl alcohol resin (A) is from 1 mol % to less than 15 mol %.

12. The package according to claim 7, wherein the polyvinyl alcohol resin (A) has a degree of saponification of 80 mol % or more.

13. The package according to claim 7, wherein the polyvinyl alcohol resin (A) has a degree of polymerization of from 200 to less than 8,000.

\* \* \* \* \*